United States Patent [19]

Adler

[11] 4,229,660

[45] Oct. 21, 1980

[54] TURBINE ELECTRIC GENERATOR WITH SOLAR HEATING AND SPACE COOLING

[76] Inventor: Harold A. Adler, 1457 Eastwind Cir., Westlake Village, Calif. 91361

[21] Appl. No.: 32,657

[22] Filed: Apr. 23, 1979

[51] Int. Cl.³ .......................... B60L 1/02; F03G 7/02; F03C 5/00
[52] U.S. Cl. ...................................... 290/2; 290/52; 290/1 R; 60/641; 60/531
[58] Field of Search ...................... 60/641, 531; 290/2, 290/1 R, 52

[56] References Cited

U.S. PATENT DOCUMENTS

| 3,932,995 | 1/1976 | Pecar | 60/531 |
|---|---|---|---|
| 4,150,923 | 4/1979 | Wardman | 417/379 |

Primary Examiner—J. V. Truhe
Assistant Examiner—John B. Conklin
Attorney, Agent, or Firm—Allan M. Shapiro

[57] ABSTRACT

Thermodynamic unit comprised of a pair of vessels which alternately generate and condense vapor are connected in a sealed system to drive a turbine with the vessel generating vapor having an outlet nozzle directed to the turbine and with the turbine exhaust being connected to the vessel condensing the vapor. Thermal control shutters and particular thermal radiation shutters control the alternate impingement of radiation onto the vessels so that the vessels each alternately act as vapor-generating and vapor-condensing vessel, and each operate at the function opposite from the other vessel.

16 Claims, 7 Drawing Figures

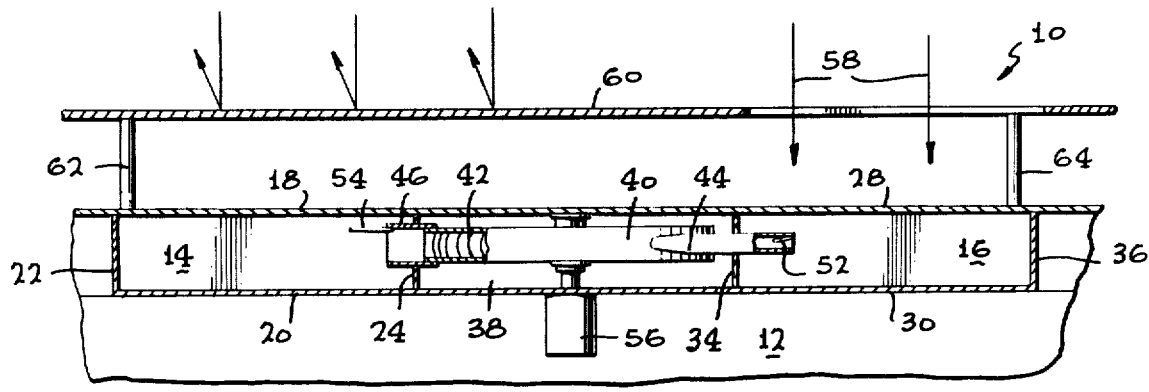
FIG. 1
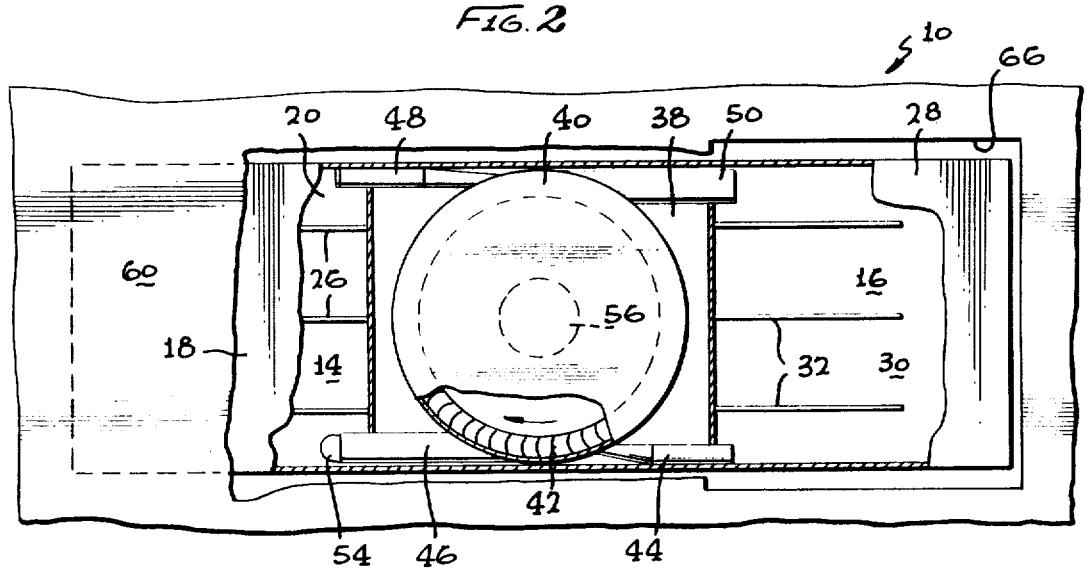
FIG. 2
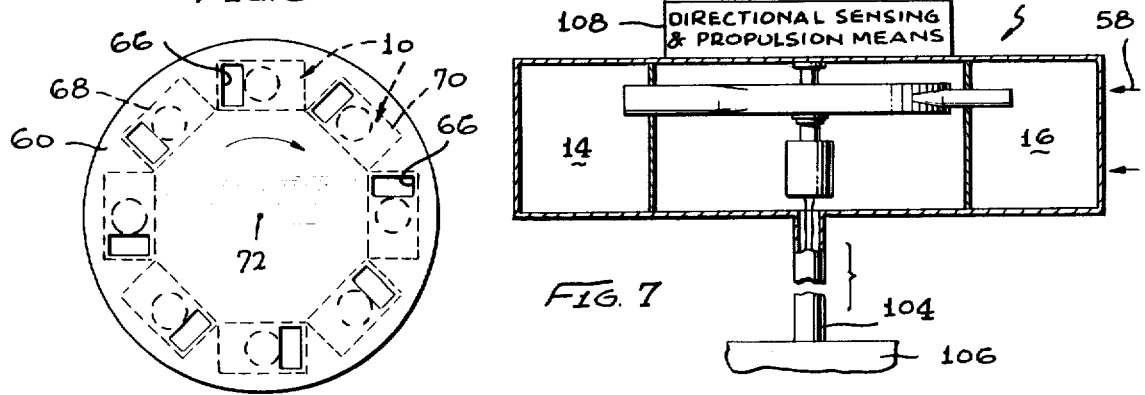
FIG. 3
FIG. 7

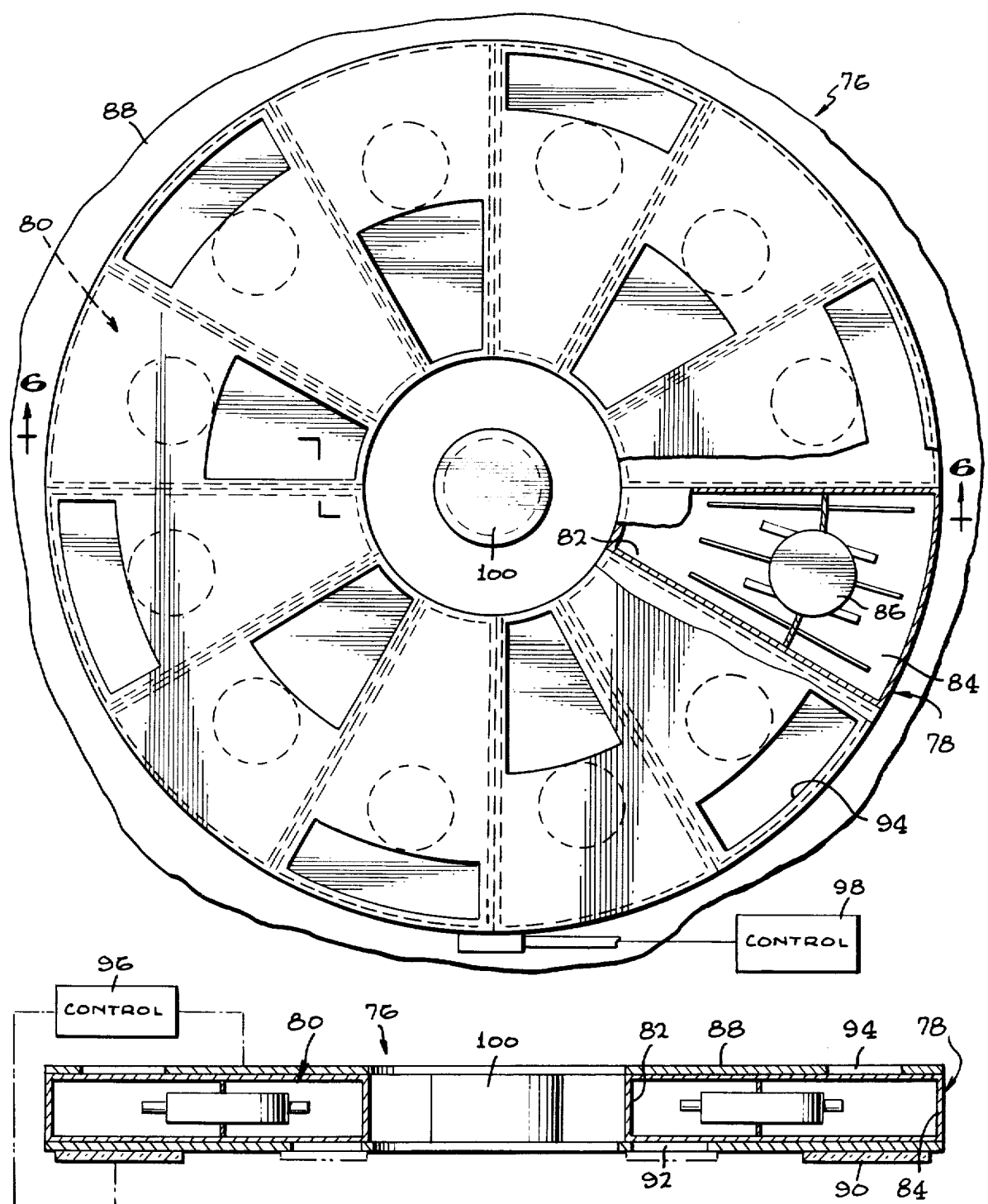

TURBINE ELECTRIC GENERATOR WITH SOLAR HEATING AND SPACE COOLING

BACKGROUND OF THE INVENTION

1. Field of the Invention

This invention is directed to a turbine electric generator means for producing electricity partuclarly from solar heat and the cold of space so that electricity is generated from solar heating and space cooling. The system is preferably employed on a space station type of space vehicle to generate electricity inexpensively, in massive amounts, to supply the energy requirements thereof and for transmittal of excess energy to other satellites and earth, but may be employed on other types of space equipment and may be employed in special circumstances on the earth's surface.

2. Description of the Prior Art

Electric systems supply the energy to many control and power systems. Electricity is generated with the various different prime energy sources. Often a boiling-condensing vapor system is used as an intermediated between thermal energy and the mechanical work which mechanically drives an electric generator. A convenient intermediate fluid is water, which usually changes in state between its liquid and vapor form in the process. Various different sources of heat for vaporizing the water have been employed. Fossil fuels (such as oil, gas and coal) have been widely used. In order to reduce the reliance on fossil fuel-fired boilers, nuclear reactions have been employed to produce the heat for producing steam which is then used to drive turbines. Such systems are conventionally partially closed systems with the condenser having its liquid drained therefrom by a feed pump which resupplies the liquid to the boiler. Such circulating systems are operative in earth surface environments, particularly where a large supply of water is available, both for cooling and for circulating system makeup.

However, in space environments, particularly on satellites such as space stations, such systems have many drawbacks and present a myriad of problems. Therefore, a step forward in the art of power generation is required.

SUMMARY OF THE INVENTION

In order to aid in the understanding of this invention, it can be stated in essentially summary form that it is directed to a turbine generator with solar heating and space cooling and the process for generating electric power therewith. A vapor-driven engine converts thermal energy in the vapor to mechanical work and can be used for driving conventional equipment, such as an electric generator. A pair of vessels are interconnected through the vapor engine. One of these vessels is heated by solar radiation to produce vapor under pressure which drives the vapor engine. The engine exhaust is cooled and condensed in the other vessel. After most of the fluid mass is transferred through the engine, the radiation input is changed so that the first vessel no longer receives substantial solar radiation, and the second vessel does receive such radiation so that vapor pressure is built up in the second vessel. Interconnections between the second and first vessels through the vapor engine also drive the engine in this direction of mass transfer.

It is thus an object of this invention to provide a turbine electric generator with solar heating and space cooling wherein first and second vessels are both connected to a vapor engine and are controlled to oppositely and alternately receive solar radiation and radiate into space to alternately generate and condense vapor to drive the engine. It is another object to provide first and second vessels which are permanently connected (through valving, if necessary) to a turbine or other vapor engine with fluid in the vessels so that, upon heating of one of the vessels and cooling of the other, the pressure of one is raised and of the other is lowered so that the fluid passes from the heated vessel through the engine to drive the engine, and the vapor is condensed in the cooled vessel. When a sufficient amount of the fluid has been transferred, the vaporizing and condensing functions are reversed for opposite mass transfer together with driving of the engine.

The features of the present invention which are believed to be novel are set forth with particularity in the appended claims. The present invention, both as to its organization and manner of operation, together with further objects and advantages thereof, may be best understood by reference to the following description taken in conjunction with the accompanying drawings.

BRIEF DESCRIPTION OF THE DRAWINGS

FIG. 1 is a longitudinal section through the turbine electric generator of this invention, taken substantially along the center line of the turbine and in a plane generally parallel to its solar radiation.

FIG. 2 is a plan view thereof, with parts broken away at various levels to show sections through the equipment.

FIG. 3 shows a plurality of the turbine electric generator sets, as shown in FIGS. 1 and 2, and circularly arranged to share solar heating shutter structure.

FIG. 4 is a side-elevational view of a plurality of sets with their outputs ganged together in parallel to supply a load.

FIG. 5 is a second preferred embodiment of the turbine electric generator equipment of this invention with solar heating and space cooling, shown in plan view with parts broken away and parts taken in section.

FIG. 6 is a section taken generally along the line 6—6 of FIG. 5.

FIG. 7 is a longitudinal section through a third preferred embodiment of the turbine electric generator of this invention taken in the same aspect as FIG. 1.

DESCRIPTION OF THE PREFERRED EMBODIMENT

FIGS. 1 and 2 illustrate the basic physical thermodynamic relationship of the turbine electric generator with its solar heating and space cooling, in accordance with this invention. The equipment is thus a power-generating unit and is generally indicated at 10 in FIGS. 1 and 2. Power-generating unit 10 is mounted on base 12 which (in the preferred embodiment) is the exterior structure of a manmade earth satellite, space station, space colony, or other type of space vehicle. Power-generating unit 10 is illustrated as being secured to the base 12 on the side of the base which generally faces the sun. In this way, it receives the solar radiation and converts it to electric power before the radiation has a chance to overheat the skin on the sunny side of base 12. If the space vehicle changes its orientation with respect to the sun, the power unit may be mounted singly or in multiples on masts or platforms which are sun-oriented.

In the preferred embodiment, the power-generating unit 10 is comprised of first and second vessels 14 and 16. First vessel 14 has front wall 18 and back wall 20. It is closed by end walls 22 and 24, as well as side walls to form a closed, rectangular pressure vessel. Radiating fins 26 are attached to the front wall 18 and depend therefrom to conduct heat into or out of the interior of vessel 14.

Similarly, second vessel 16 has front and back walls 28 and 30 with radiating fins 32 depending from wall 28. End walls 34 and 36, as well as the illustrated side walls, interconnect front wall 28 and back wall 30 to enclose second vessel 16. As is seen in FIG. 1, front wall 18 may be continuous with front wall 28, and back wall 20 may be continuous with back wall 30 to provide rigidity to the unit.

Turbine space 38 has turbine casing 40 therein. Turbine wheel 42 is rotatably mounted within the casing 40. Nozzle 44 and exhaust header 46 connect the vessel 16 through turbine casing 40 to vessel 14. Similarly, nozzle 48 and exhaust header 50 connect first vessel 14 through turbine casing 40 to second vessel 16. Check valves in each of the nozzles and exhaust headers permit flow in only the direction indicated above. Check valves 52 and 54 are illustrated in FIG. 1 leftward through nozzle 44 and exhaust header 46. With vapor flow in that direction, turbine wheel 42 is turned. Generator 56 is connected to the turbine wheel and is turned thereby to generate electricity upon the turning of the turbine wheel.

It should be noted from FIG. 1 that generator 56 is positioned behind the back walls 20 and 30 and within the base 12 so that access for generator maintenance can easily be achieved.

The upwardly facing top surface of the front walls 18 and 28 are treated for maximizing radiant energy transfer. A dull, black surface is usual for this purpose. Base 12 is preferably rotated so that the front walls 18 and 28 are directed toward incoming solar radiation represented by arrows 58. Shield 60 is mounted in front of the front walls on support braces 62 and 64 to control the solar radiation impinging upon the front walls. The upper surface of shield 60 is preferably reflective, but shield 60 has window 66 therein which will permit the solar radiation 58 to pass through the window to impinge upon the exposed vessel front wall. When shield 60 is in the position illustrated in FIGS. 1 and 2, front wall 28 of second vessel 16 is exposed to the radiation, while incoming radiation is substantially prevented from reaching front wall 18 of first vessel 14. Instead, the front wall 18 of first vessel 14 can radiate into the space between the front wall 18 and the back of shield 60. This space is provided by the standoff effect of the support braces.

When an appropriate thermodynamic fluid is placed in the vessels, it responds to the difference in temperature resulting from the difference in incoming and outgoing radiation. In order to achieve a maximum amount of energy transfer for a particular volumetric size of the vessels, a change in state of the fluid is preferable. Presuming a substantial amount of liquid in second vessel 16, the incoming radiation heats the vessel and its liquid contents to cause vaporization and an increase in pressure. The vapor flows through nozzle 44 to drive turbine wheel 42. The exhaust vapor at reduced pressure passes through exhaust header 46 into first vessel 14, where it is condensed because of the lower temperature. The heat of condensation is discharged from first vessel 14 both into base 12 where the heating thereof is desirable and out through front wall 16 into the space behind shield 60. When substantially all of the liquid has been boiled out of second vessel 16, then the first step of the cycle has been completed. If the unit is operating in a zero gravity environment, then a liquid-vapor separator may be employed at the inlet to nozzle 44.

Upon completion of the first step of the cycle, shield 60 is arrange so that there is a window over front wall 18, and the window 66 over front wall 28 is closed or moved away. A convenient way to accomplish this if the unit 10 is a single unit is to rotate shield 60 on the axis of wheel 42 and generator 56. With a half-turn rotation, then the window 66 is positioned over front wall 18, while front wall 28 is now shaded. The previous step of the cycle having been the condensation of the vapor into first vessel 14, now the radiation on the front wall 18 causes vaporization of the liquid in first vessel 14 so that vapor is driven through nozzle 48 to drive turbine wheel 42 while the exahust vapor from the turbine wheel passes through exhaust header 50 back to second vessel 16 where it is condensed. When all of the liquid has been boiled away in first vessel 14, passing through the turbine and being condensed in second vessel 16, then the second step of the cycle is complete.

It is seen that the first and second vessels each alternately act as a boiler and as a condenser. With these alternating functions, the name "boiler-condenser" has been condensed to a coined word "boden" to identify these individual vessels. The thermodynamic fluid used in the bodens of the unit is selected in accordance with the particular temperature involved. As previously stated, a change of state is preferable so that a considerable mass can be stored, boiled away, transferred through the turbine and condensed in a smaller volume structure than if a gaseous thermodynamic fluid were used. The selection depends principally on the temperature ranges encountered and the pressure limits desired. Water is a suitable fluid providing the temperature can be controlled so that it does not freeze in space environments. Various fluorinated hydrocarbons and other thermodynamic fluids may be considered for particular applications.

For the production of more power, a plurality of units 10 may be positioned adjacent each other. In FIG. 3, unit 10 is illustrated as being positioned in a circular arrangement with a plurality of other units, two of which are indicated at 68 and 70. All of the units are identical, and shield 60 is positioned over all of the units. There is a plurality of the windows in the shield located to expose one of the bodens of each unit. Shield 60 is rotatable around axis 72 which is at the center of the circular arrangement of units. In this way, the bodens of each unit are alternately exposed to solar radiation for heating, and are shielded therefrom for cooling.

FIG. 4 illustrates the units as being electrically connected in parallel with each of the generators of the units connected to load 74 to supply the electrical requirements of the load.

FIGS. 5 and 6 illustrate another arrangement of turbine electric generator units, each with a pair of bodens for solar heating and space cooling. The plurality of units is in an assembly generally indicated at 76 with the units of the assembly acting together and being controlled together to produce electric power. Furthermore, the assembly 76 is arranged with a shield assembly both front and back so that heating of one of a pair of bodens is accomplished by solar radiation, and cooling of its companion is accomplished by radiation to deep space. In other words, the assembly 76 is not secured directly to the surface of a space vehicle, but may be positioned on a mast outward of such a vehicle. Units 78 and 80 are shown in both FIGS. 5 and 6. As illustrated in FIG. 5, each of the units is tapered or pie-shaped, and there is a sufficient number to complete a circular assembly of units. Each of the units has a pair of bodens, with bodens 82 and 84 illustrated for unit 78. A turbine wheel is positioned in turbine housing 86, and a pair of nozzles and exhaust headers are provided to permit heated and pressurized fluid to pass from one boden to the other, driving the turbine on the way. A generator is connected to be driven by each turbine, or the turbines can be mechanically ganged together to drive one generator if desired. However, the redundancy of one generator on each turbine is preferred for reliability. The circular, pie-shaped arrangement increases the solar efficiency because a higher fraction of the area facing the sun is open to a boiling boden to effectively employ the solar radiation. Additionally, the frontal shield 88 is arranged with a plurality of windows so that a window is arranged in front of one of the bodens in each unit. Furthermore, the windows are alternately arranged. Rear shield 90 is of the same configuration as front shield 88 and has corresponding windows therein. Window 92 is positioned behind boden 82. The front and rear shields 88 and 90 are rotatably mounted on a central axis and are arranged to rotate together. They are angularly arranged so that, when one boden of a unit is exposed to dark space by a rear window, the opposite boden of the unit is exposed to radiation from the sun. For example, front window 94 exposes boden 84 to incoming solar radiation for heating thereof; window 92 exposes boden 82 to deep space for cooling outward radiation thereby. Controller 96 senses the conditions in the two bodens of at least one unit to determine when a step of the cycle is completed. This can be determined by decrease in the pressure differential between the two bodens of the unit because, when all liquid is boiled off of the higher temperature, higher pressure boden, the pressure differential decreases. At the same time, the temperature of the boden receiving solar radiation will rise because no more boiling can take place to absorb the heat. Therefore, temperature-sensing equipment may also be used to determine the end of a step in the cycle. This signal is transmitted to position controller 98, which is connected to shield driver 100. Shield driver 100 then moves the shields to the position where each boden is exposed in the opposite way. Thus, a boden which has been exposed to solar radiation is now exposed to radiate heat to space, while its companion in the same unit has the opposite exposure. In this way, electric power is generated.

The thermodynamic power-generating unit 102 of FIG. 7 is basically the same as that illustrated in FIG. 1 as 10 and so similar parts bear the same reference numerals. The unit 102 of FIG. 7, however, is designed for use without a separate shield. The unit 102 is illustrated as mounted upon a mast 104 projecting from a satellite 106 with appropriate bearing journals (not shown) for rotation of the unit with respect to the satellite. A directional sensing and propulsion means 108 is indicated in block form as mounted upon the power-generating unit 102 and may be the same as controls 96 and 98 previously described or may include radiation sensors, rockets and other conventional devices familar to those skilled in the space arts for sensing and controlling directional orientation. In operation, the boden 16 is shown as receiving the solar radiation 58 while the boden 14 is exposed to deep space (generally to the left) and is shielded from the radiation 58 by the remainder of the unit 102. When it becomes desirable to reverse the functions as heretofore described, the unit is rotated by the operation of the directional sensing and propulsions means 108 so that the opposite boden is exposed to solar radiation and the previously exposed boden is shielded therefrom. It will be clear that the unit 102 need not be physically mounted upon or otherwise attached to the satellite 106 and may be a separate power-generating satellite by itself with appropriate energy-transmissions means from the unit 102 to a remote satellite 106 or other object.

This invention having been described in its several embodiments, it is clear that it is susceptible to numerous modifications and embodiments within the ability of those skilled in the art and without the exercise of the inventive faculty. Accordingly, the scope of this invention is defined by the scope of the following claims.

What is claimed is:

1. A turbine electric generator unit with solar heating and space cooling comprising:
    a first vessel;
    a second vessel;
    a turbine casing having a turbine wheel therein;
    nozzle means connected to both said first vessel and said second vessel for conducting vapor flow from one of said vessels into said turbine casing to impinge upon said turbine wheel to turn said turbine wheel;
    exhaust header means connected between said turbine casing and both of said vessels for conducting exhaust vapor from said casing to one of said vessels; and
    means for first selectively heating said first vessel so that thermodynamic fluid therein is heated and raised in pressure for delivering vapor under pressure to said turbine wheel and for cooling said second vessel to maintain a lower exhaust pressure in said second vessel than the vapor pressure in said first vessel so that exhaust vapor flow flows through said exhaust header into said second vessel, and said means for heating being also for selectively heating said second vessel and cooling said first vessel.

2. The unit of claim 1 wherein said means for heating comprises a window in a shield positioned over only one of said vessels so that solar radiation can pass through said window and heat said one of said vessels, said shield being positioned over the other of said vessels to substantially reduce radiant heating of said other of said vessels.

3. The unit of claim 2 wherein said shield is movable so that said window is first over said first vessel when said second vessel is shielded and can be moved so that said window is over said second vessel and said first vessel is shielded.

4. The unit of claim 3 wherein an electric generator is connected to said turbine wheel to be rotated by said turbine wheel.

5. The unit of claim 2 wherein there are a plurality of said units arranged adjacent each other and said means for controlling heating is connected to each of said units.

6. The unit of claim 4 wherein there are a plurality of said units positioned adjacent each other and said shield extends over said plurality of units, there being a plurality of windows in said shield so that in a first position of said shield a window exposes one vessel in each unit to radiant heating and said shield covers the other vessel, while in another position of said shield a window exposes said other vessel of each unit to radiant heating and said shield covers the other vessel so that said vessels in each unit are alternately exposed to radiant heating and shielding.

7. The plurality of units of claim 6 wherein said units are substantially circularly arranged and said shield is rotatably mounted.

8. The plurality of units of claim 7 wherein means is provided for said vessel which is not exposed to heating radiation to radiate heat away.

9. The plurality of units of claim 8 wherein said means for radiating heat away is a means for permitting radiation to radiate to deep space.

10. The plurality of units of claim 6 wherein said plurality of generators are connected together to a common load.

11. The unit of claim 2 wherein means is provided for radiating heat away from said vessel which is shielded from heating radiation to permit it to radiate heat into deep space for cooling said shielded vessel.

12. The unit of claim 11 wherein said means for permitting radiation into deep space from said vessel which is shielded from heating radiation comprises a window exposing said vessel to deep space.

13. The unit of claim 2 wherein a valve is connected in said nozzle means to permit high pressure vapor to flow into said turbine casing and a valve is positioned in said exhaust header to permit low pressure vapor to flow out of said turbine casing.

14. The unit of claim 1 wherein said means for heating comprises propulsion means for selectively rotating said unit to expose said first vessel to solar radiant heat while maintaining said second vessel in non-exposed relationship to solar radiant heat, and alternately selectively rotating said unit to so expose said second vessel while so maintaining said first vessel in non-exposed relationship.

15. The process for producing electric power from solar radiation comprising the steps of:
  raising pressure in a first vessel having thermodynamic fluid therein by exposing the first vessel to solar radiation;
  delivering the pressurized fluid through a turbine to a second vessel while driving the turbine;
  generating electric power from turbine rotation;
  condensing turbine exhaust fluid in a second vessel while cooling the second vessel by protecting it against solar radiation, and continuing said steps until substantially all of the fluid is delivered from the first vessel into the second vessel;
  thereupon exposing the second vessel to solar radiation to vaporize fluid therein and raise vapor pressure; and
  delivering pressurized vapor from the second vessel through the turbine to the first vessel while driving the turbine while condensing exhaust vapor from the turbine in the first vessel by protecting the first vessel from substantial solar heating.

16. The process of claim 15 wherein the step of condensing fluid in a vessel while protecting the vessel from solar radiation includes the step of exposing the vessel where vapor is condensing to radiate away from said condensing vessel.

* * * * *